C. R. RANEY.
BINDING MECHANISM.
APPLICATION FILED NOV. 19, 1913.

1,226,376.

Patented May 15, 1917.
2 SHEETS—SHEET 1.

Witnesses:
F.W. Hoffmeister

Inventor:
Clemma R. Raney.
By Chas. E. Lord
Atty.

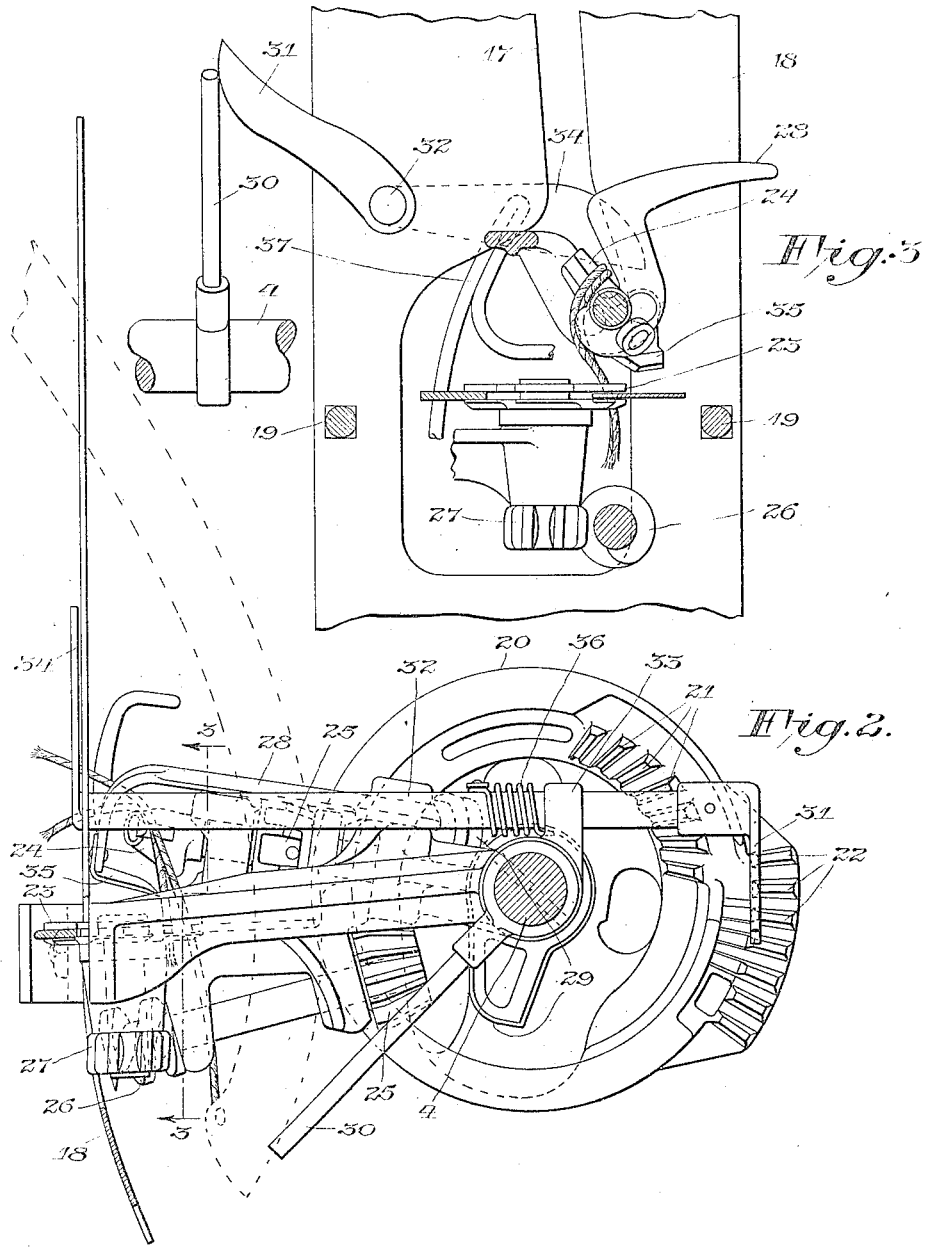

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

BINDING MECHANISM.

1,226,376.  Specification of Letters Patent.  Patented May 15, 1917.

Application filed November 19, 1913. Serial No. 801,889.

*To all whom it may concern:*

Be it known that I, CLEMMA R. RANEY, a citizen of the United States, residing at Chicago, in the county of Cook and State of Illinois, have invented certain new and useful Improvements in Binding Mechanisms, of which the following is a full, clear, and exact specification.

My invention relates binding mechanisms.

Difficulty has heretofore been experienced in connection with binding mechanisms, particularly those of the type used on shocking machines, due to the fact that improper tucking and stripping of the twine from the binder hook has been obtained, with the result that there has been a tendency for the binding mechanism to operate inefficiently, the knot being improperly tied, the twine being caught or broken after the knot has been tied or the band on the shock being stripped therefrom or rotated with respect thereto in such a manner as to seriously interfere with the standing of the shock or the operation of the binding mechanism.

My invention has for its object to improve such binding mechanisms, providing a mechanism wherein the twine is automatically tucked and stripped in an improved manner during the operation of the same. A further object of my invention is to provide improved mechanism whereby the stripping or rotation of the band upon the shock is effectually prevented. I attain these objects by the provision of an improved tucker automatically coöperating with the binding mechanism, and an improved stripper likewise coöperating therewith and carried by the shock discharging cradle of the shocker, the two devices operating automatically, respectively, to tuck the twine during the first stages of the knotting operation and to strip the twine from the knotter hook after the knot has been tied.

In this application I have shown one embodiment which my invention may assume in practice, describing herein a construction of the type shown in my copending application, Serial No. 573,106, filed July 21, 1910, this application being a continuation of that application in so far as the common features of the two applications are concerned. It is to be understood, however, that the embodiment of my invention shown herein may be modified.

Fig. 2 is a detail end elevation of the binding mechanism;

Fig. 3 is a sectional view taken on line 3—3 of Fig. 2;

Figure 1:
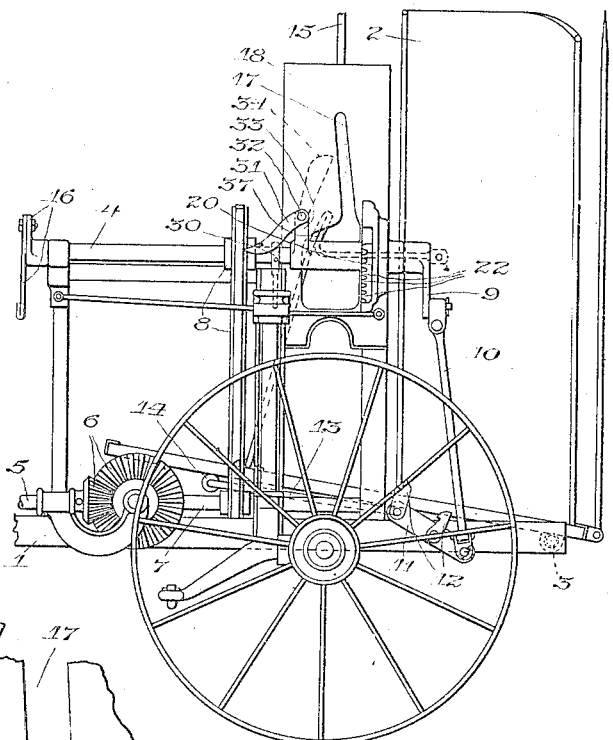
Figure 1 is a side elevation of a portion of a shocker equipped with my improvement.

The shocker shown is of the type described and claimed in my above mentioned application, comprising a main frame 1 having a rearwardly dumping shock receptacle or cradle 2 pivotally mounted thereon at 3 and adapted to dump the bound shock from the cradle. As shown, a knotter shaft 4 is disposed longitudinally of the frame 1 and carried on the top thereof at one side of the cradle, being operatively connected to a main power shaft 5 through beveled gears 6, a suitable clutch mechanism, not shown, a supplemental longitudinally extending shaft 7, and chain and sprocket connections 8 in such a manner that the knotter shaft may be rotated when desired to dump the cradle and actuate the binding mechanism. As shown, the cradle 2 is of the type described and claimed in that application and is operatively connected with the knotter shaft in such a manner as to move in timed relation thereto, the connection preferably being to a crank 9 on the end of the knotter shaft. This crank 9 is pivotally connected to a downwardly extending link 10, which is, in turn, connected to a second pivoted link 11 having gravity latch members 12 thereon adapted to engage and disengage, as the cradle is moved to discharge a shock, the latter being actuated by a dumping arm 13 operatively connected to the link 11 and disposed beneath the cradle bottom, having a roller 14 thereon which engages with the cradle bottom, when the knotter shaft is turned, in such a manner as to throw the bottom upward and outward as the arm 13 is raised.

The binding mechanism operated by the knotter shaft 4 comprises a needle 15 pivoted on the far side of the shocker frame 1 from the knotter shaft and operatively connected to the latter through a suitable link connection 16, not shown in detail, this needle coöperating with the knotter mechanism proper, which is carried between the chain connection 8 and the rearward end of the knotter shaft. As shown, the needle 15 moves through an opening or slot 17 in a knotter breastplate 18 fixed to the frame at 19 and extending upwardly on the stubble-ward side of the knotter mechanism. Although any desired type of knotter may be used with my improvement, the knotter mechanism shown herein for purposes of illustration is of the well-known Deering type, being provided with a driving cam 20 fixed to the knotter shaft 4 and having arcuate concentrically arranged geared or toothed sections 21 and 22 thereon, respectively, driving the notched rotating cord holding plate 23 and the knotter hook 24 through beveled gears 25, worm 26 and worm gear 27; the knotter stripper 28 being driven through the usual roller and cam connection 29. All of this mechanism, however, operates in such a well-known manner and is constructed in accordance with standard design that it seems unnecessary for it to be herein more specifically described.

Figure 4:
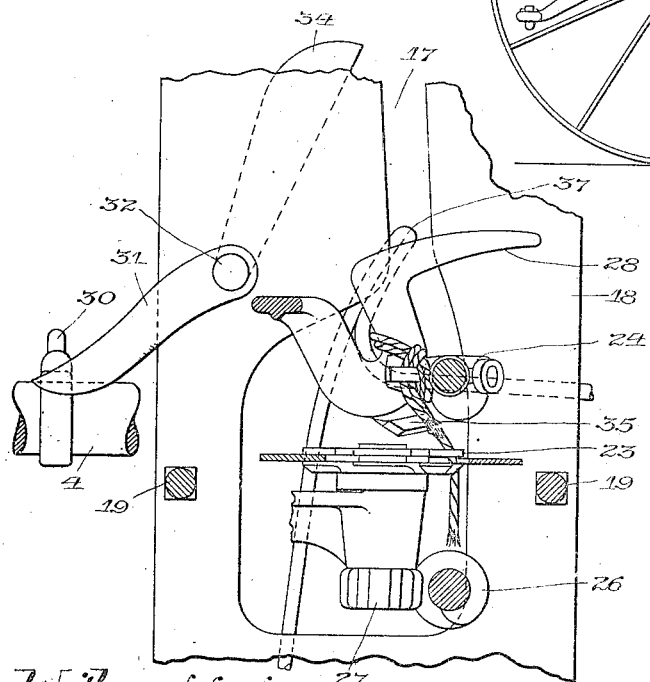
Fig. 4 is a similar sectional view showing the binding mechanism in another position.

Coöperating with this knotting mechanism and carried upon the knotter shaft 4 is an operating member 30, which is shown herein to assume the form of a cam or pin extending laterally from the knotter shaft 4. This operating member engages a coöperating member 31, preferably having a curved cam shape, carried on the outer or grainward end of a short shaft 32 disposed transversely of the shocker frame and journaled in a bracket 33 carried on the shaft 4 and in the knotter breastplate 18. As shown, the member 31 on the outer end of this shaft extends a substantial distance beyond the end of the bracket 33 and protrudes into the path of the operating member 30, so that as the knotter shaft is rotated this member 30 raises the member 31 in such a manner as to throw a straight edged tucker arm 34, carried on the inner end of the shaft 32, down across the slot 17 in the breastplate to coöperate with the knotter stripper 28 as the latter moves across the opening. It is to be noted that as this stripper moves across the opening in the slot the knotter hook 24 opens to receive the twine and turns toward the breastplate, the parts moving from the position shown in Fig. 3 to the position shown in Fig. 4, when a knife 35, movable with the stripper, is brought into play to sever the twine at a point between the cord holding plate 23 and the knotter hook. It is thus seen that the tucker serves to maintain the twine under tension and move the same down to the knotter hook, reducing the amount of twine required and coöperating with the stripper 28 of the knotter during the first stages of the binding operation, and that, prior to the completion of the binding operation, the operating member 30 has moved a sufficient degree to enable the tucker arm to be carried back by a spring 36 on the shaft 32 to the normal position thereof shown in Fig. 4. Coöperating with the knotter stripper 28 at this time is also a supplemental stripper member carried on the shocker cradle 2. As shown, this stripper member comprises a forwardly inclined hook 37 fixed to the knotter side of the cradle, normally occupying the position shown in Fig. 1, and extending across the path of the twine in such a manner that, as the cradle is operated through its connection with the knotter shaft, this hook 37 is brought opposite the bottom of the slot, as shown in Fig. 4, at the time the knotter stripper 28 occupies the position shown therein, the knotter stripping member 28 moving at that time in a forward direction, while the hook 37 moves in a rearward direction with the cradle, with the result of effectually stripping the twine from the hook by pulls in opposite directions.

It is to be noted that the construction shown herein acts not only to tuck the twine during the first stages of the binding operation, coöperating at that time with the binding mechanism of the knotter, and acting at a point between the receptacle and the breastplate in such a manner as to eliminate difficulty due to the spacing of the parts, but also acts to strip the same from the knotter hook during the last stages of the binding operation, the stripper arm on the shocker cradle engaging the twine and pulling the same off the hook by a pull exerted in the opposite direction from that exerted by the knotter stripping member, with the result that the twine is pulled clear over the end of the knotter hook, and all catching, stripping of the band from the shock, or rotation of the band thereon, is effectually prevented. It is further to be noted that the mechanism is entirely automatic in its operation, being driven from the knotter shaft which operates the binding mechanism and that the parts are so timed that the cradle is moved at the desired time to enable its hook to coöperate with the binding mechanism in the manner described, the knot being stripped during the first stages of the cradle movement.

While I have in this application described one form which my invention may assume in practice, it is, of course, to be understood that the form chosen for purposes of illustration may be modified without departing from the spirit of the invention, and it is likewise to be understood that I intend to cover herein all embodiments of my invention operating to perform the same functions by means of such modifications.

What I claim as my invention, and desire to secure by Letters Patent, is:

1. In a shocking machine, a frame; a dumping shock receptacle thereon, means for dumping said shock receptacle, mechanism including a knotter for binding a shock therein, and means for stripping the twine from said knotter thereby preventing stripping of the band from the bound shock as said shock receptacle is dumped.

2. In a shocking machine, a frame, a dumping shock receptacle thereon, means for dumping said shock receptacle, mechanism including a knotter for binding a shock therein, and means for stripping the twine from the knotter as the shock is dumped thereby preventing rotation of the band upon the bound shock.

3. In a shocking machine, a frame, a dumping shock receptacle carried thereon, shock binding mechanism including a knotter carried on said frame, and means on said receptacle coöperating with said knotter to strip the twine therefrom as said receptacle moves toward dumping position.

4. In a shocking machine, a frame, a dumping shock receptacle thereon, mechanism including a knotter for binding a shock therein, and means for stripping the twine from the knotter and thereby preventing stripping of the band from the bound shock or rotation of said band as said receptacle is dumped.

5. In a shocking machine, a frame, shock binding mechanism thereon including a knotter having a hook, a dumping shock receptacle carried on said frame, and supplemental means operating as said receptacle is moved to dumping position coöperating with said knotter to strip the twine from the knotter hook.

6. In a shocking machine, a frame, shock binding mechanism thereon including a knotter having a stripper and a hook, a dumping shock receptacle carried on said frame, and supplemental means operating as said receptacle is moved to dumping position coöperating with said stripper to strip the twine from the knotter hook.

7. In a shocking machine, a frame, shock binding mechanism thereon including a knotter having a stripper and a hook, a dumping shock receptacle carried on said frame, and supplemental means operating as said receptacle is moved to dumping position and moving in an opposite direction to said stripper coöperating with said stripper to strip the twine from the knotter hook.

8. In a shocking machine, a frame, a knotter shaft journaled thereon, a dumping shock receptacle operatively connected with said knotter shaft and dumped thereby, shock binding mechanism including a knotter operatively connected to said knotter shaft, and means carried on said receptacle coöperating with said knotter to strip the twine after a knot is tied.

9. In a shocking machine, a frame, shock binding mechanism including a knotter having a stripper, a dumping shock receptacle operatively connected with said knotter, and means carried on said receptacle and movable in an opposite direction to said stripper coöperating with said stripper to strip the twine after a knot is tied.

10. In a shocking machine, a frame, shock binding mechanism thereon including a knotter having a movable stripping member, a dumping shock receptacle carried on said frame, and a stripping member movable with said receptacle coöperating with the stripper of said knotter mechanism and movable in an opposite direction with respect thereto.

11. In a shocking machine, a frame, shock binding mechanism thereon including a knotter having a stripping member and hook, a dumping shock receptacle carried on said frame, and a hook carried on said receptacle coöperating with the stripping member of said knotter and stripping the twine from the knotter hook as said receptacle is operated.

12. In a shocking machine, a frame, a shock binding mechanism thereon including a knotter having a stripper, a knotter shaft on said frame operatively connected to said knotter, a shock discharging receptacle carried on said frame and operatively connected with said shaft, and a stripping member on said receptacle coöperating with said stripper.

13. In a shocking machine, a frame, a tilting shock receptacle thereon, shock binding mechanism on said frame including a knotter, means on said receptacle coöperating with said knotter to strip the twine as said receptacle is tilted, and means operatively connected between said knotter shaft and receptacle for tilting the latter.

14. In a shocking machine, a frame, shock binding mechanism thereon including a knotter having a stripping member and hook, a knotter shaft journaled on said frame, a dumping shock receptacle carried on said frame, operatively connected with said knotter shaft and actuated thereby, and a hook carried on said receptacle coöperating with the striping member of said knotter and stripping the twine from the knotter hook after the knot has been tied and as the shock receptacle moves to dumping position.

15. In a shocking machine, a frame, a knotter shaft journaled thereon, shock binding mechanism on said frame including a knotter having a stripper and hook, a slotted breastplate for said knotter, a shock receptacle carried on said frame and operatively connected with said knotter shaft, and means carried on said shock receptacle and moving across said slot on the needle side of said breastplate and coöperating with the knotter stripper to strip the twine from the knotter hook.

16. In a shocking machine, a frame, shock binding mechanism including a knotter carried thereon, a knotter shaft operatively connected to said knotter, a dumping shock receptacle carried on said frame, supplemental means operatively connected with said knotter shaft tucking the twine during the initial part of the binding operation of said knotter, and means movable with said shock receptacle stripping the twine after a knot has been tied by said knotter.

17. In a shocking machine, a frame, shock binding mechanism thereon including a knotter, a knotter breast plate carried on said frame, a dumping shock receptacle carried on said frame and disposed at one side of said breast plate, means operatively connected to said knotter and movable between said receptacle and breast plate for tucking the twine during the initial stages of the knotting operation, and means for subsequently dumping said receptacle.

18. In a shocking machine, a frame, shock binding mechanism thereon including a knotter, a dumping shock receptacle carried on said frame and disposed at one side of said knotter, means coöperating with said knotter for stripping the twine from the same during the last stages of the knotting operation, means for dumping said receptacle operating in timed relation with said knotter and stripping means, and supplemental stripping means coöperating with said first mentioned means during the initial stages of the movement of said receptacle.

19. In a binding mechanism, a frame, a knotter carried thereon, a knotter shaft, a tucker shaft disposed transversely with respect thereto, a knotter breastplate, means intermediate said tucker shaft and said knotter shaft rotating said tucker shaft during the first stages of the knotting operation, and a tucker arm operatively connected to said shaft and movable across the slot in said breastplate on the opposite side of the breast plate from said knotting mechanism.

20. In a binding mechanism, a frame, a knotter shaft journaled thereon, knotting mechanism operatively connected to said shaft comprising a slotted breast plate, a knotter hook, a stripper, a cord holder, a spring-pressed shaft journaled on said frame and breast plate and disposed transversely of said knotter shaft, means on said knotter shaft rotating said transverse shaft during the initial stages of the knot tying operation, and a tucker arm carried on said transverse shaft and moving across the slot in said breastplate to tuck the twine as said transverse shaft is rotated.

21. In a binding mechanism, a frame, a knotter shaft thereon, a knotter thereon, a knotter breast plate thereon, a tucker shaft journaled on said breast plate and frame above said knotter shaft and disposed transversely of the latter, said tucker shaft having a lateral extension on one end of the same, supplemental tucker shaft rocking means operatively connected to said knotter shaft and engageable with said extension, and a tucker arm carried on the opposite end of said tucker shaft and movable across the opposite face of said breast plate from said knotting mechanism upon rotation of said shaft.

22. In a binding mechanism, a frame, a knotter shaft thereon, a knotter thereon, a knotter breast plate thereon, a tucker shaft journaled on said breast plate having a lateral projection on one of its ends, a tucker shaft actuating member carried on said knotter shaft and intermittently engageable with said projection, a tucker arm carried on said tucker shaft and movable across the face of said breast plate upon actuation of said shaft, and a coiled spring operatively connected between said frame and tucker shaft for returning the latter to its initial position after each actuation thereof by said member.

23. In a binding mechanism, a frame, a knotter shaft thereon, knotter mechanism thereon operatively connected with said shaft, a knotter breast plate carried on said frame, a tucker shaft journaled on said frame and breast plate, resilient means operatively connected to said shaft and frame normally holding the former in a predetermined position, operative connections between one end of said shaft and said knotter mechanism imparting movement to the former in opposition to said resilient means, and a tucker arm carried on the opposite end of said shaft movable across one of the faces of said breast plate.

24. In a shocking machine, a frame, shock binding mechanism including a knotter having a stripper and a hook, a knotter breast plate carried on said frame, a tucker operatively connected to said knotter and movable across the face of said breast plate during the first stages of the knotting operation, a dumping shock receptacle carried on said frame, means for moving the same in an opposite direction to said knotter stripper, and a stripping hook on said shock receptacle engaging the twine during the last stages of said knotting operation and movable with said shock receptacle coöperating with the stripper of said knotter mechanism in stripping the twine from the knotter.

25. In a shocking machine, a frame, shock binding mechanism thereon including a knotter having a stripper, a knotter breast plate carried on said frame, a tucker carried on said frame and operatively connected to said knotter and movable thereby across the face of said breast plate during the initial stages of the knotting operation, a dumping shock receptacle carried on said frame, and means movable as said receptacle is operated and operable after the completion of said tucking operation coöperating with said stripper to strip the twine from said knotter.

26. In a shocking machine, a frame, shock binding mechanism thereon including a knotter having a stripper, a knotter breast plate carried on said frame, a tucker carried on said frame and operatively connected to said knotter and movable thereby across the face of said breast plate during the initial stages of the knotting operation, a dumping shock receptacle carried on said frame, and means carried on said receptacle and operable after the completion of said tucking operation coöperating with said stripper to strip the twine from said knotter.

27. In a shocking machine, a frame, shock binding mechanism carried thereon including a knotter having a stripper, a knotter breast plate carried on said frame, a supplemental tucker carried on said frame and operatively connected to said knotter movable across the opposite face of said breast plate from said knotter during the initial stages of the knotting operation, a dumping shock receptacle carried on said frame, and means movable as said receptacle is operated and moving in an opposite direction to said knotter stripper operable after the completion of said tucking operation and coöperating with said stripper to strip the twine from said knotter.

28. In a shocking machine, a frame, a knotter shaft thereon, knotter mechanism operatively connected to said shaft, a needle carried on said frame and operatively connected to said knotter, a dumping shock receptacle pivoted on said frame in rear and beneath said knotter mechanism and disposed at one side of the latter and between the same and said needle, operative connections between one end of said knotter shaft and said shock receptacle for tilting the latter about its pivot, and means on said shock receptacle engageable with the twine during the first stages of the tilting operation of said receptacle coöperating with said knotter mechanism in stripping the twine therefrom.

29. In a shocking machine, a frame, a knotter shaft journaled thereon, knotting mechanism operatively connected to said shaft comprising a knotter hook and a stripper, a spring-pressed shaft journaled on said frame transversely of said knotter shaft, means on said knotter shaft intermittently rotating said transverse shaft, a slotted knotter breast plate, a tucker arm carried on said transverse shaft moving across the slot in said breastplate to tuck the twine during the initial stages of the knotting operation, a dumping shock receptacle carried on said frame and operatively connected to said knotter shaft and dumped thereby after the knot has been tied, and a supplemental twine stripping member carried on said receptacle and engaging the twine extending through said slot to said knotting mechanism during the first stages in the movement of said receptacle and the last stages of the movement of said knotter, said twine engaging member coöperating with the knotter stripper to strip the twine from the knotter hook and operating after said tucker has returned to its normal position.

In testimony whereof I affix my signature in the presence of two witnesses.

CLEMMA R. RANEY.

Witnesses:
J. H. HANLY,
A. F. STRATTON.